Nov. 12, 1957  J. A. MARCILLY  2,813,026
WINE-MAKING PLANT
Filed March 9, 1954  4 Sheets-Sheet 3
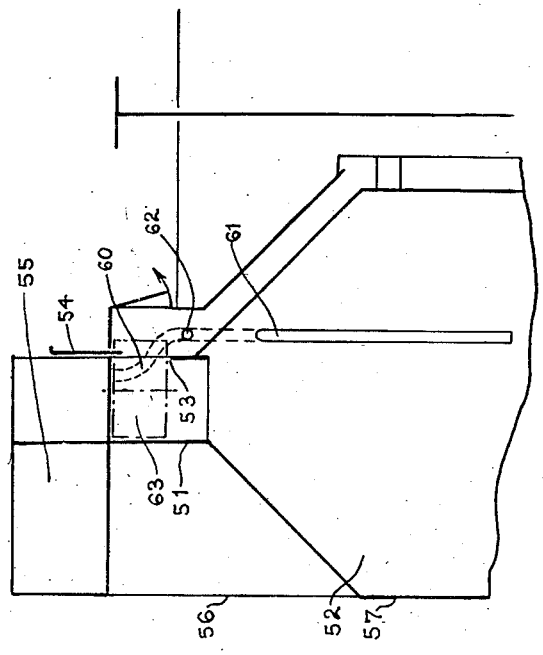
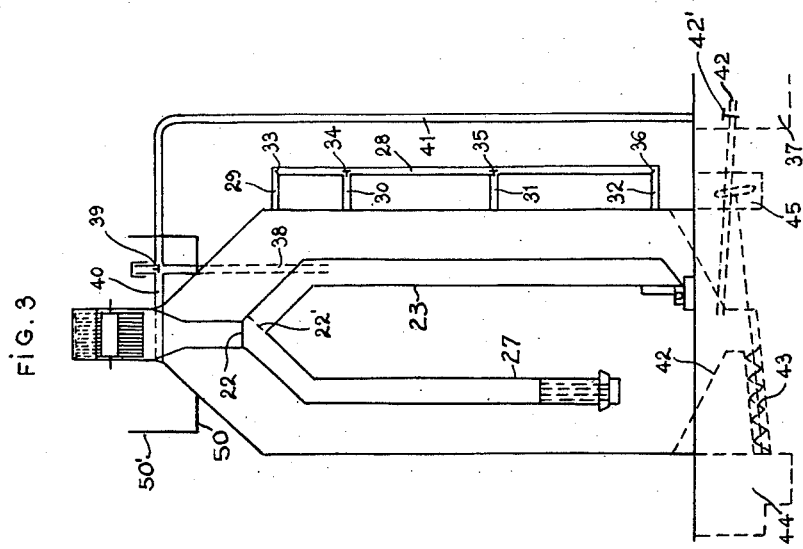

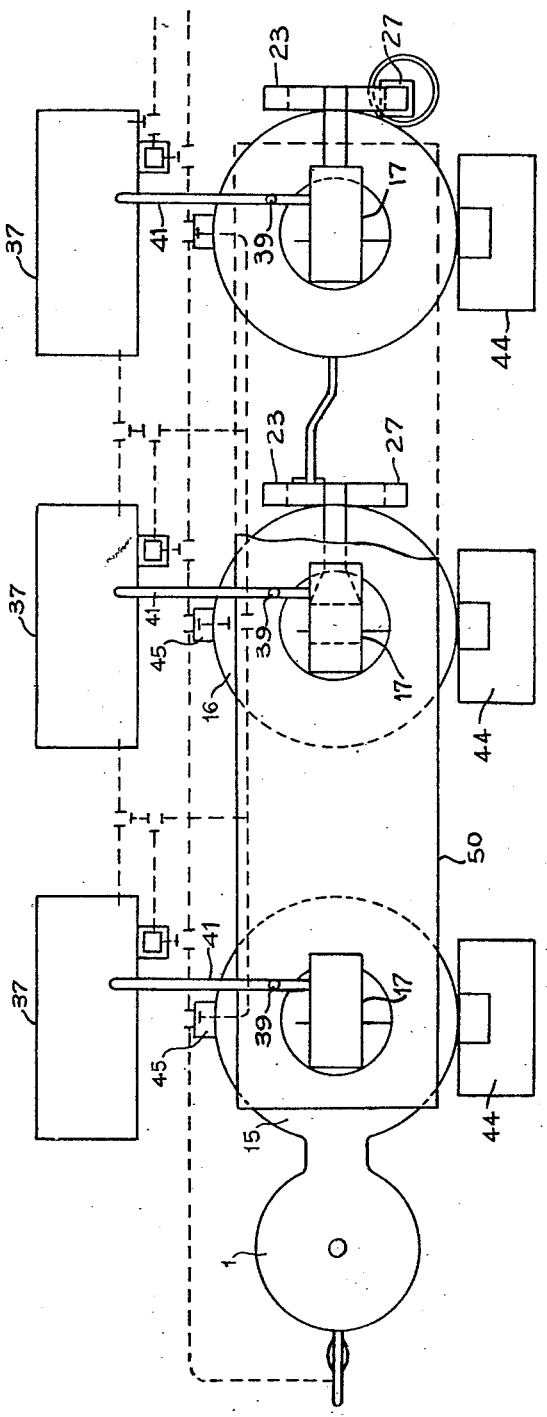

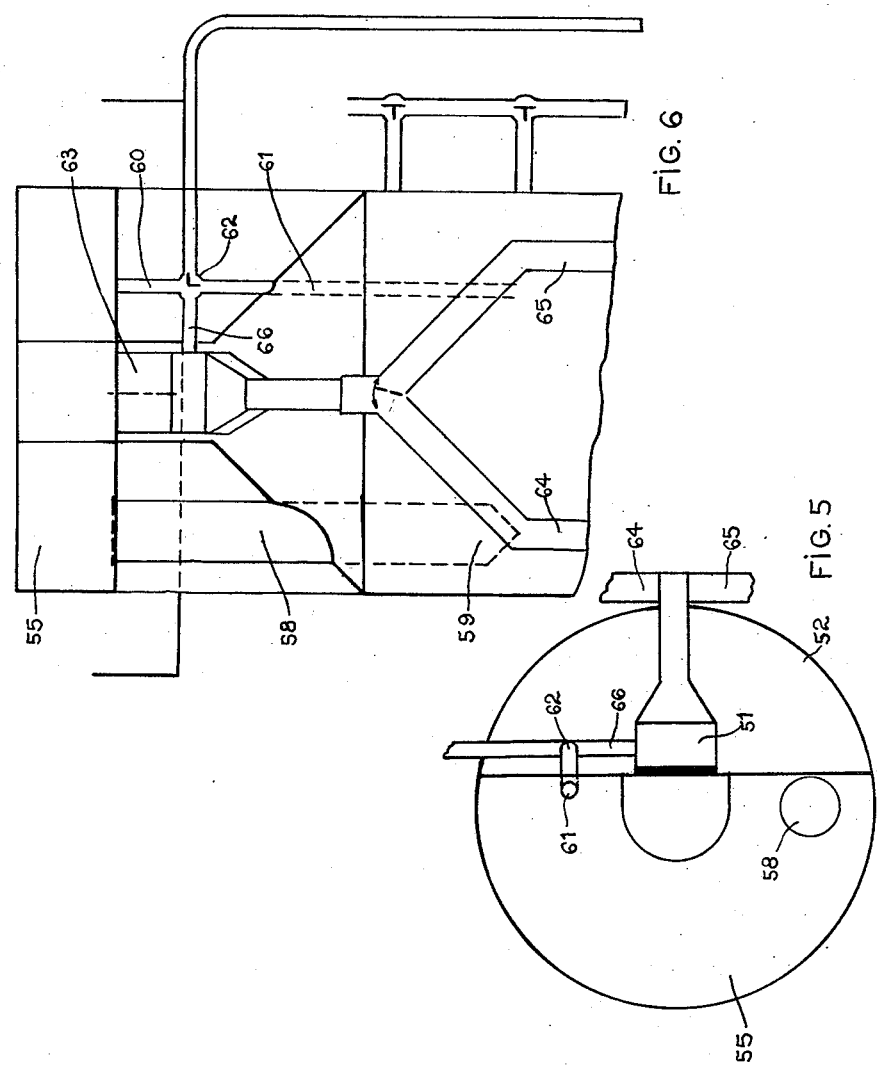

United States Patent Office

2,813,026
Patented Nov. 12, 1957

---

2,813,026

WINE-MAKING PLANT

Jean Adolphe Marcilly, Meknes, Morocco

Application March 9, 1954, Serial No. 415,113

Claims priority, application France March 20, 1953

9 Claims. (Cl. 99—35)

It is well known that the wine-making process that gives best qualities to the wine is the process known as "floating top method." According to this process, the marc of the crushed grapes separates from the must, rises to the surface into contact with the air and is pushed down again into the must at regular intervals.

This process however, does not afford uniform results and requires a great amount of manpower. It has therefore been practically given up.

The object of the invention hereinafter described is a wine-making plant, particularly an industrial wine-making plant, which operates according to the above mentioned process but without its drawbacks and with many important advantages that will become apparent from the following specification.

The wine-making plant in accordance with the invention is essentially characterized in that it includes a chain of interconnected vats, means for conveying successively the crushed grapes from one vat to the next and means in each vat to stir up the marc.

The fermenting process is thereby fractionated into several stages, a special vat being assigned to each stage so that there is no possibility for a stage going on in a given vat to interfere in the course of the fermentation going on in a neighboring vat.

Each vat is provided with devices for checking and regulating the corresponding course of fermentation.

By way of example, a portion of an industrial wine-making plant with a chain of vats will be described hereinafter and illustrated schematically in the annexed drawing, said portion comprising a primary vat and three to four fermentation vats.

A modified form will also be described.

In the drawings:

Fig. 2 is a plan of said vats.

Fig. 3 illustrates in elevation the second vat seen at an angle of 90° to that illustrated in Fig. 1.

Figs. 4, 5 and 6 show, in side elevation, front elevation and plan, respectively, the upper portion of another embodiment of the fermentation vats.

Figure 1:
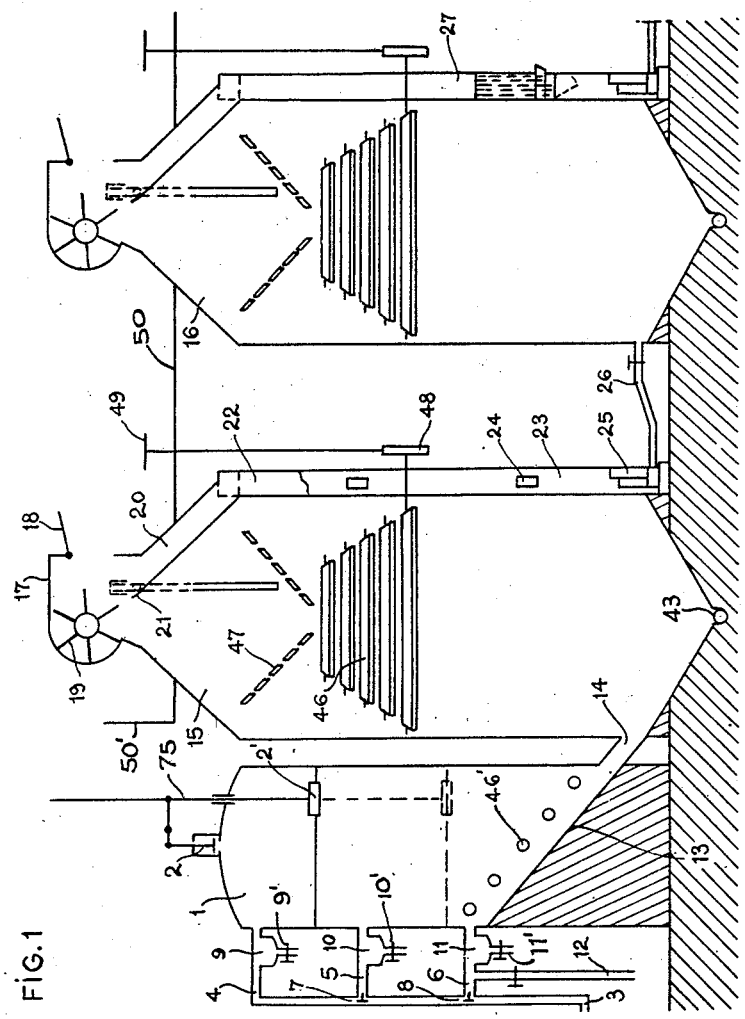
Fig. 1 shows an elevational view of the primary vat and the first two fermentation vats.

The primary vat 1, which is smaller than the fermentation vats, is closed and provided at the top with an adjustable valve 2. Inside the vat, a float 2' supporting a vertical rod 75 that passes through the roof makes it possible to check the filling of the vat and, by operating the valve, to maintain the required level. A main pipe 3, through which are brought the crushed grapes, divides into several branches 4, 5 and 6 which lead into the vat at various levels. Any of these branches can be switched in by means of three-way valves 7 and 8. Blending pans 9, 10 and 11, fed by pipes provided with valves 9', 10' and 11', allow the required amount of sulphur dioxide or of any other antifermenting agent to be blended into the crushed grapes. Another pipe 12 leading to the lower branch 6 may be used to introduce, if necessary, other ingredients such as yeast (or ferments) acid correctives, etc. The bottom 13 of said primary vat slants steeply and an inclined pipe 14 connects the lower part with the bottom of the first vat 15 of the fermentation vats 15, 16.

If, for instance, the fermenting process is to last three full days, the capacity of each fermentation vat will be at least equal to one day's total supply of crushed grapes and the plant will consist of at least three vats so that every fraction of the grapes which passes from one vat to the next, as explained below, will remain a full day in each vat and flow out of the third vat after the fermenting process is nearly over. All the fermentation vats are identical. The vat 15, open at the top, bears a removable airtight hood 17 provided with a door 18. This hood contains a paddle-wheel or a cog-wheel 19 driven by a motor (not shown) to discharge the marc. A drain 20 containing an overflow sill 21 comes down from the hood. The drain 20 is connected with the top 22 of a junction of two pipes, a fixed down pipe 23, provided with viewing ports 24, leading to a pump 25 which, through a pipe 26, drives the grapes to the lower part of the next fermentation vat and a second fixed down pipe 27 the end of which is perforated and opens into the top of a wine press (not shown). A hinged plate 22' (Fig. 3), at the top of the junction, makes it possible to direct the juice toward either of pipes 23 or 27. A side pipe 28, extending from the top to the base of the vat and connected therewith at various levels through branch pipes 29, 30, 31 and 32 provided with three-way valves 33, 34, 35 and 36, makes it possible, by means of a pump (not shown), to mix the musts existing at various levels in the same vat or coming from another vat and to draw the wine in process of completion or in the course of fermentation.

To each fermentation vat is annexed an underground service reservoir 37 the capacity of which is $1/15$ of the vat, for instance. An open plunger tube 38 which extends down into each fermentation vat (Fig. 3) is connected by a three-way valve 39 with a pipe 40 that extends to the overflow sill 21 and a pipe 41 that extends downwardly to the service reservoir 37.

The bottom of each vat is conical or V-shaped and discharges through an Archimedean screw 43 into a refuse sump 44. The Archimedean screw is operated by a hand wheel arranged in an access pit 45. A drain 42 with a valve 42' connects the bottom of the vat with the service reservoir 37.

Each fermentation vat contains two V-shaped sets of inclined grates 46, 47 with adjustable slots intended to stir up the marc and slacken its ascent. These grates are made of hollow swivelling blades inside which a cold fluid may be caused to flow to bring the crushed grapes to the most favorable temperature. The pipe forming the axis of one of the blades goes through the wall of the vat and carries a toothed wheel 48 operated by means of a hand wheel 49, the rotary motion of which is transferred to the other blades in known manner (not shown) to adjust the inclination of the blades.

The grates are placed in the upper part of the vats to assure a normal proportion of marc and must when the overflow of the crushed grapes takes place and also because the temperature is always highest in the upper part of the vat and is advisable to keep the temperature of the crushed grapes as low as possible at the time the contents of the vat overflow and come into contact with the air.

In countries where the crushed grapes fed to the primary vat are at a temperature below 18° C. (64° F.), the primary vat will be equipped with a grate 46' intended to assure the required warming up. Since warm air moves upwardly, the grate is placed in the lower part of the vat and therefore the temperature of the crushed grapes moving downwards is progressively increased and will be uniform when they flow into the first fermentation vat.

Should cold crushed grapes arrive in the lower part of the first fermentation vat, the grapes might accumulate therein without fermenting.

All the vats and service reservoirs are interconnected by means of pipes with three-way valves (shown in dotted lines) which make it possible to carry out all the required transfers.

At the top of the vats which are, for example, about thirty feet high, a gangway 50 with a railing 50' gives access to the checking and regulating apparatus.

The wine-making plant described above works as follows:

The grapes, freshly crushed and stemmed or not stemmed, are directed to the upper part of the primary vat after receiving on the way the necessary blendings of yeasts and correctives, said correctives being thereby in a position to act, if necessary, before fermentation starts. In some cases it may be advisable to introduce beforehand in the primary vat what is known as a "leavening," i. e., a fraction of crushed grapes having already started to ferment.

At that preparatory stage, the solid part of the grapes sinks to the bottom of the vat and a fraction of the must and marc will pass into the first fermentation vat. The levels in the primary vat and first fermentation vat become even.

The product arriving into the first fermentation vat is thus prepared and the fermenting process sets in regularly throughout the entire mass. After the gas starts bubbling out in the primary vat, the pressure in this airtight vat can be controlled by means of the valve 2 so that the level rises to the top of the first fermentation vat.

If necessary, the temperature in the primary vat can be controlled through the pipes of the grate 46'. The eventual adjustment of the temperature and the stirring of the ascending marc in the fermentation vats are carried out through the pipes and the grates equipped with swivelling blades 46 and 47.

The filling level in the primary vat is controlled by means of the float and the crushed grapes are fed until they reach a predetermined level, thus making it possible to control the fermentation process in the entire plant for any of the following processes:

(1) To accelerate the fermentation process when the must has a moderate content of sulphur dioxide and the level in the primary vat is high. Fermentation has already developed to a high degree in the crushed grapes arriving in the first fermentation vat.

(2) To slacken the fermentation and allow the grapes to macerate with the sulphur dioxide in the case of a must with a strong proportion of said sulphur dioxide, the level in the primary vat being high.

(3) To merely slacken fermentation in the case of a must with a moderate content of sulphur dioxide, the level in the primary vat being lower.

By carrying the levels in the primary vat, it becomes possible to clear this vat of the marcs accumulating at the top as a consequence of a too rapid development of the fermentation.

These fluctuations of the level are brought about by reducing or increasing the volume of gas that balances the pressure in the first fermentation vat but these fluctuations are not instantaneous. The amount of leavening will be modified more readily by making a change in the primary vat from a top feeding to a bottom feeding, the fresh product in the latter case reaching the first fermentation vat in a more direct way.

When the fermentation vat 15 is full, for instance after the first day's work, the combined must and marc will overflow at the top into the drain 20 and the down pipe 22 and will be driven by the pump 25 into the next vat 16. This operation will be repeated from vat to vat in order that every fraction of the must, when leaving the plant, has fermented sufficiently to bring the wine to a specific gravity slightly above 1000 or higher.

From the last vat the wine is transferred into the service reservoir 31 while the marc is sent to the press through the pipe 27.

The fermenting stage that takes place in each vat is easily controlled by means of the usual checking apparatus (thermometer, pressure gauge, etc.) and by any of the following operations: introducing air or preventing its introduction to vary the ascending rate of the marc and the force with which it is stirred, evacuating the marc from any vat at a given selected speed by means of the paddle wheel, separating the wine from the marc by means of the distributing plate 22' and either one of the pipes 23 or 27, or blending the musts or drawing them at various stages of fermentation by means of the pipe 28. The dregs and refuse that settle at the bottom of each vat are driven into the sumps 44 by means of the Archimedean screws 43.

Of course the flow of the crushed grapes into the primary vat, although continuous, cannot be altogether regulated, and temporary stoppages may occur. The plant in accordance with the present invention makes it possible to deal with such irregularities.

After they have been cleaned, the fermentation vats will be made suitable for receiving the new wine by merely substituting a funnel for the hood 17. The wine can be rapidly cooled in the vats and thus the tartar is made to settle and the wine is clear.

Although it allows for stoppages of a few hours, the wine-making plant described above and illustrated in Figs. 1 to 3 is essentially intended for use in a continuous feeding of crushed grapes.

In the second embodiment of the wine making plant illustrated in Figs. 4 to 6 and described below, a device is added which makes it possible to carry out the fermentation process under continuous feeding and also renders possible a prolonged stoppage, for an entire night for instance, without stopping the vinification, and the resumption the following day of continuous feeding and fermentation in accordance with the process of the invention.

This second embodiment is essentially characterized in that each head of a fermentation vat is provided with an airtight shutter, and that, at an upper level, there is a small open tank, the bottom of which is provided with an open pipe running down into the upper part of the fermentation vat.

When the feeding is stopped, the airtight shutter of the vat is closed simultaneously, the carbonic acid gas raises the top level of the grapes to the upper part of the fermentation vat, the pressure raises some must in the small tank, and the carbonic acid gas flows out through this mass of must.

Thus, the wine-making process which is carried out according to the "floating top method" when the feeding is continuous becomes a wine-making process according to the "immersed top method" for as long as the feeding is stopped.

The general arrangement of the embodiment shown in Figs. 4, 5 and 6 is similar to that shown in Figs. 1, 2 and 3.

An air tight shutter 54, movable upwardly, is positioned in the casing 51 of the head of each fermentation vat 52 above the overflow sill. The airtight shutter is shown in opened position in Fig. 4.

A small open tank 55 is positioned above the upper portion of the fermentation vat. This tank has the shape of a half of a crown, with a hollowed out center. The edge of the tank 55 is supported by a semi-circular wall 56 resting upon the top of the cylindrical edge of the vat 52. A large open pipe 58 (Fig. 6) comes out of the bottom of the tank 55 and dips into the upper part of the vat 52 down to the level 59. The pipe 58 is provided with lower and upper strainers. A smaller pipe 60 connects the plunging open pipe 61 with the bottom of the tank 55, beyond a several-way valve 62.

This modified wine-making plant operates as follows, to treat a three-day vintage with overnight stoppage.

On the first day, the continuous wine-making process is carried out as indicated for the plant illustrated in Figs. 1, 2 and 3.

Feeding is interrupted at the end of the day. When the overflow of the first fermentation vat slows down, the airtight shutter 54 closes. After the must and marc of the overflow have reached the second fermentaion vat and when the overflow in this vat slows down, the airtight valve of this second vat is closed in turn, and so on until the airtight shutter of the last fermentation vat is closed.

The plant is then left to work alone during the entire night. In each vat, the carbonic gas produced by the fermentation raises the top level of the grapes to the upper part of the vat, increases the internal pressure, and, through the pipe 58, raises the fermenting must in the tank 55. Then, at a given pressure, the carbonic gas escapes into the open while bubbling through the must of the small tank 55.

It will be seen that, under these circumstances, each fermentation vat will operate according to the "immersed top process."

On the following morning, before feeding in the primary vat is resumed, the airtight shutter 54 of the last fermentation vat is opened, the paddle wheel or cog wheel on the vertical axis 63 in the casing 51 is actuated and the marc in the vat is raised by the must flowing back from the small tank and sent to the press through the pipe 64. The airtight shutter of the next preceding fermentation vat is then opened, the marc accumulated in the upper part of that vat is sent into the pipe 65 and into the pump where it is mixed with the must of the small tank 55 arriving through the smaller pipe 60 and the pipe 66, so that the pump operates normally in sucking some must and some marc. When the first fermentation vat has been put into service again, the feeding of the primary vat is started.

What I claim is:

1. A plant for continuously producing wine, comprising in combination a primary vat, valved cover means for said vat, means for introducing crushed grapes into said primary vat, means therein for heating the crushed grapes a first fermentation vat, a downwardly inclined connection pipe between the bottom of the primary vat and the lower bottom of the first fermentation vat through which crushed grapes fall to the bottom of said first fermenation vat, a plurality of inclined grates with adjustable slots in the upper part of said first fermentation vat, means for adjusting said grates to stir the marc produced by the fermentation of the grapes and to retard its ascendant movement under the pressure of the gaseous components produced by the fermentation, means at the top of the first fermentation vat for discharging simultaneously the grape marc and must therefrom, means for transferring said marc and must from the first fermentation vat into the first of a series of additional fermentation vats.

2. A plant for continuously producing wine, comprising in combination a primary vat, valved cover means for said vat, means for introducing crushed grapes into said primary vat, pans connected at different levels with the inside of said primary vat for blending yeasts and correctives with the crushed grapes introduced in the primary vat, a first fermentation vat, a downwardly inclined connection pipe between the bottom of the primary vat and the bottom of the first fermentation vat through which crushed grapes fall to the bottom of said first fermentation vat, a plurality of inclined grates with adjustable slots in the upper part of said first fermentation vat, means for adjusting said grates to stir the marc produced by the fermentation of the grapes and to retard its ascendant movement under the pressure of the gaseous components produced by the fermentation, means at the top of the first fermentation vat for discharging simultaneously the grape marc and must therefrom, means for transferring said marc and must from the first fermentation vat into the first of a series of additional fermentation vats.

3. A plant for continuously producing wine, comprising in combination a primary vat, valved cover means for said vat, means for introducing crushed grapes into said primary vat, pans connected at different levels with the inside of said primary vat for blending yeasts and correctives with the crushed grapes introduced in the primary vat, a first fermentation vat, a downwardly inclined connection pipe between the bottom of the primary vat and the bottom of the first fermentation vat through which crushed grapes fall to the bottom of said first fermentation vat, a plurality of inclined grates with adjustable slots in the upper part of said first fermentation vat, means for adjusting said grates to stir the marc produced by the fermentation of the grapes and to retard its ascendant movement under the pressure of the gaseous components produced by the fermentation, means at the top of the first fermentation vat for discharging simultaneously the grape marc and must therefrom, means for transferring said marc and must from the first fermentation vat into the first of a series of additional fermentation vats, and means associated with each vat for regulating the temperature of its contents.

4. A plant according to claim 3 in which the inclined grates for stirring the marc and for retarding its ascendant movement consist of tiltable swivelling hollow blades and means connected to said hollow blades for passing a refrigerant through the hollow blades.

5. A plant according to claim 4 further comprising screw means located in the bottom of each fermentation vat, a refuse sump and means for activating the screw means in each vat to remove dregs and refuse to said refuse sump.

6. A plant according to claim 5 further comprising an overflow sill disposed in the upper portion of said first fermentation vat, means defining a chamber positioned to receive material flowing over said sill, and pump means connected to said chamber for transferring said material to the next succeeding fermentation vat, the lower portion of a pipe extending downwardly into the first fermentation vat, a service reservoir, and a three-way valve connecting said pipe with the overflow sill and with said service reservoir.

7. A plant according to claim 6 further comprising a side-pipe disposed adjacent each fermentation vat and a series of vertically spaced branch pipes extending between said pipe and the adjacent vat, and three-way valves in said branch pipes for controlling flow through each branch pipe.

8. A plant for continuously producing wine, comprising in combination a primary vat, valved cover means for said vat, means for introducing the crushed grapes into said primary vat, a series of identical fermentation vats, a downwardly inclined pipe between the bottom of the primary vat and the lower bottom of the first of said fermentation vats through which crushed grapes fall to the bottom of said first fermentation vat, pipes connecting the top of each fermentation vat with the bottom of the following fermentation vat, pump means in said connection pipes to propel through the pipes the marc and must produced by the fermentation of the grapes, a tight head casing secured on the upper edge of each fermentation vat, an overflow sill attached to said upper edge of each fermentation vat and disposed to discharge into the connection pipe of the vat, a shutter disposed on the head casing above said overflow sill to separate said connection pipe from the inside of the fermentation vat when the introduction of grapes is interrupted for a period of time, an evacuation pipe connected to the connection pipe under the overflow sill for removing the marc, a hinged plate disposed at the junction of the connection pipe and the evacuating pipe to give free communication between the overflow sill and one of said two pipes, a tank mounted above the head casing of the vat, a pipe with upper and lower strainers disposed to connect said tank with the inside of the fermentation vat through which the carbonic gas pressure resulting from the fermentation of the grapes raises the must to said tank when the shutter is tightly closed, a pipe extending into the vat, a service reservoir, a four-way valve disposed to connect selectively said last-named pipe with the service reservoir and said tank with the overflow sill, screw means located in the bottom of the fermentation vat, a refuse sump, and means for activating the screw means in each vat to remove dregs and refuse to said refuse sump.

9. A once-through process of preparing wine which comprises progressively passing crushed grapes to be fermented through a series of connected zones, initially supplying crushed grapes to a starting zone, supplying correctives to the crushed grapes at the desired level in the starting zone, supplying ferments at the desired level in the starting zone, initiating fermentation in the starting zone, passing the treated grape mass by gravity to the bottom of the first of a plurality of fermentation zones, forming a marc and a must therein, selectively stirring the marc into the must in the upper portion of each of said fermentation zones to retard the movement of the marc to the top of the must, selectively removing the refuse from the bottom of each of the fermentation zones, selectively cooling the marc and must in the upper portion of each of the fermentation zones to the desired fermentation temperature, progressively discharging the marc and the must from the upper portion of each of the fermentation zones to the bottom of the next of the series of fermentation zones, selectively excluding access of air in each of the fermentation zones by building up gas pressure from the fermentation therein, controlling the degree of immersion of the marc in the must by the internal gas pressure maintained independently in the top of each of the fermentation zones, removing the marc and must from the last of the fermentation zones and separating the completely fermented must from the marc.

References Cited in the file of this patent
UNITED STATES PATENTS

| | | |
|---|---|---|
| 2,536,993 | Cremaschi | Jan. 2, 1951 |
| 2,536,994 | Cremaschi | Jan. 2, 1951 |